May 29, 1934.  F. MACY  1,960,248
METHOD OF AND MEANS FOR PREPARING AND APPLYING
FIBROUS COVERS TO BOTTLES AND THE LIKE
Filed March 31, 1932  14 Sheets-Sheet 9
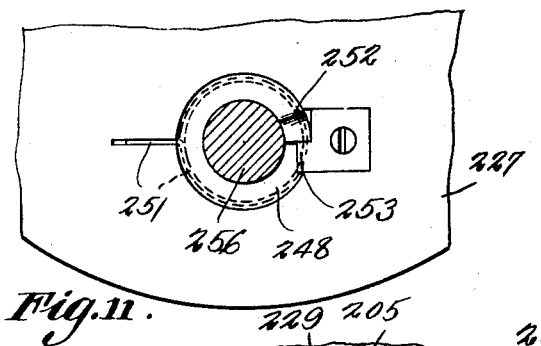
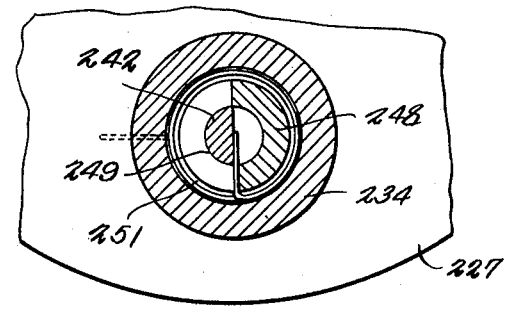
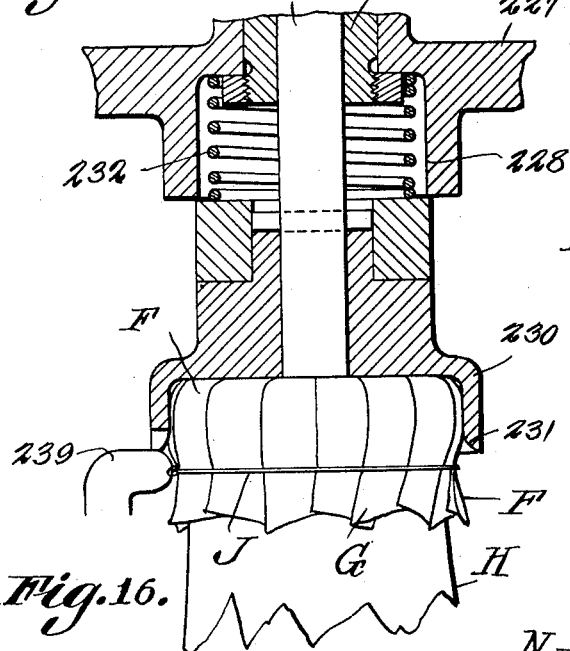
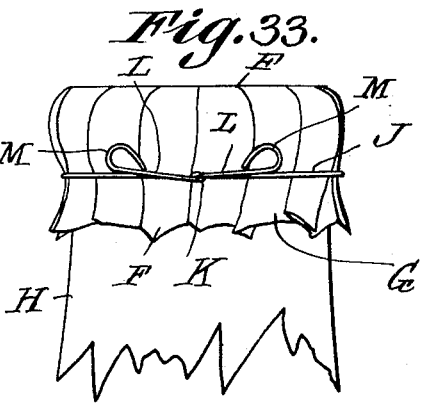
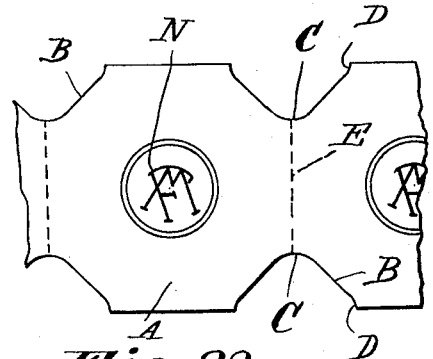
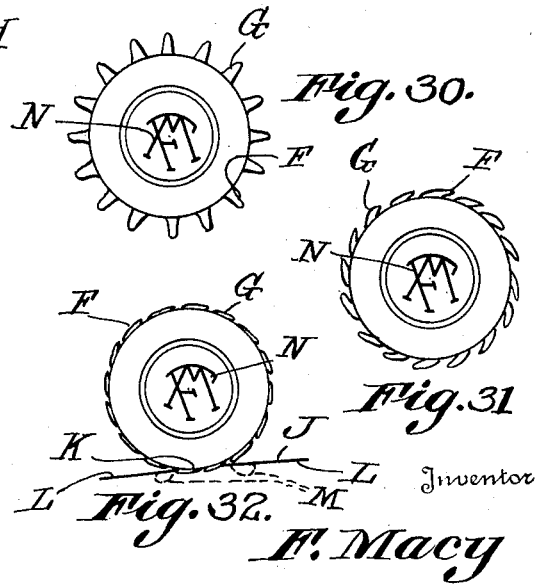

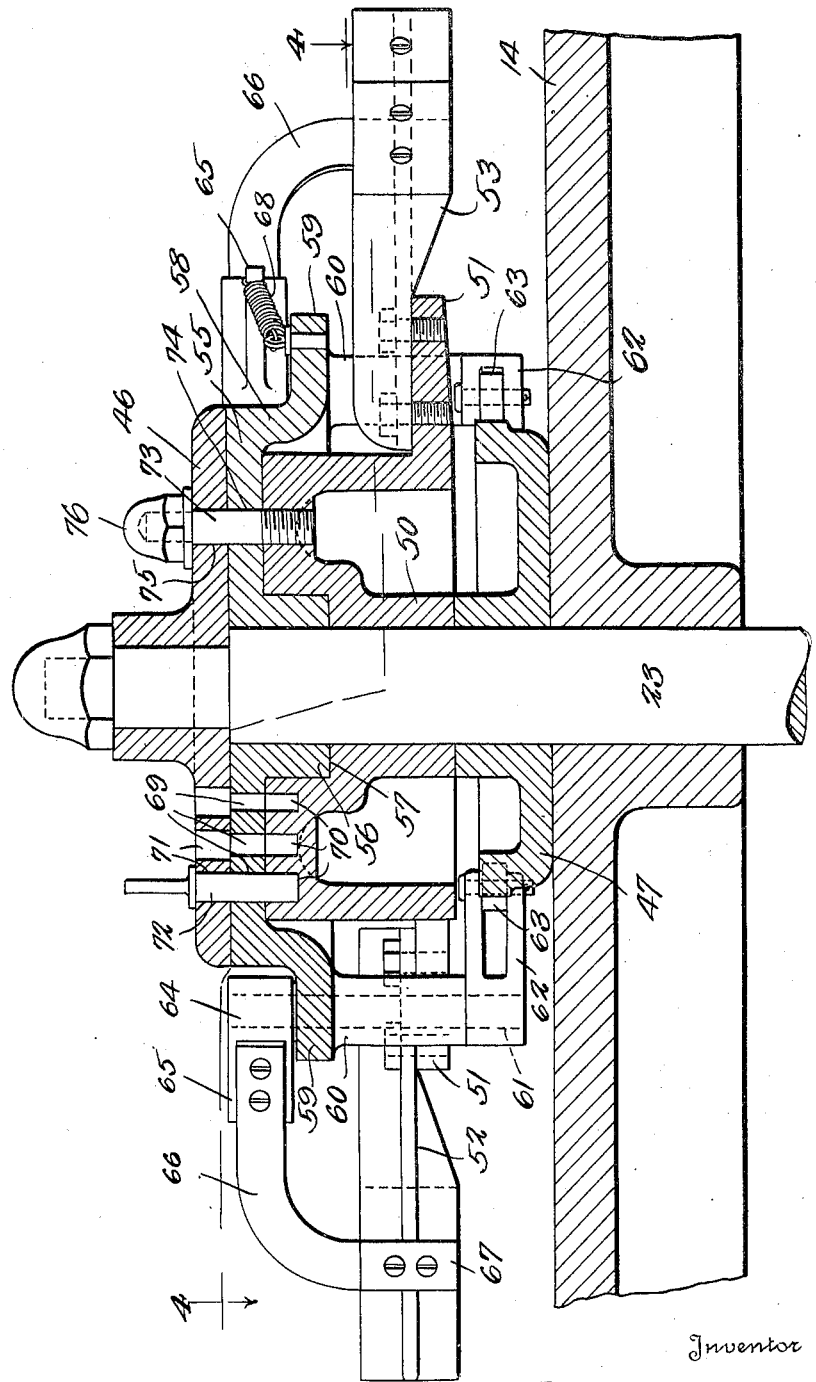

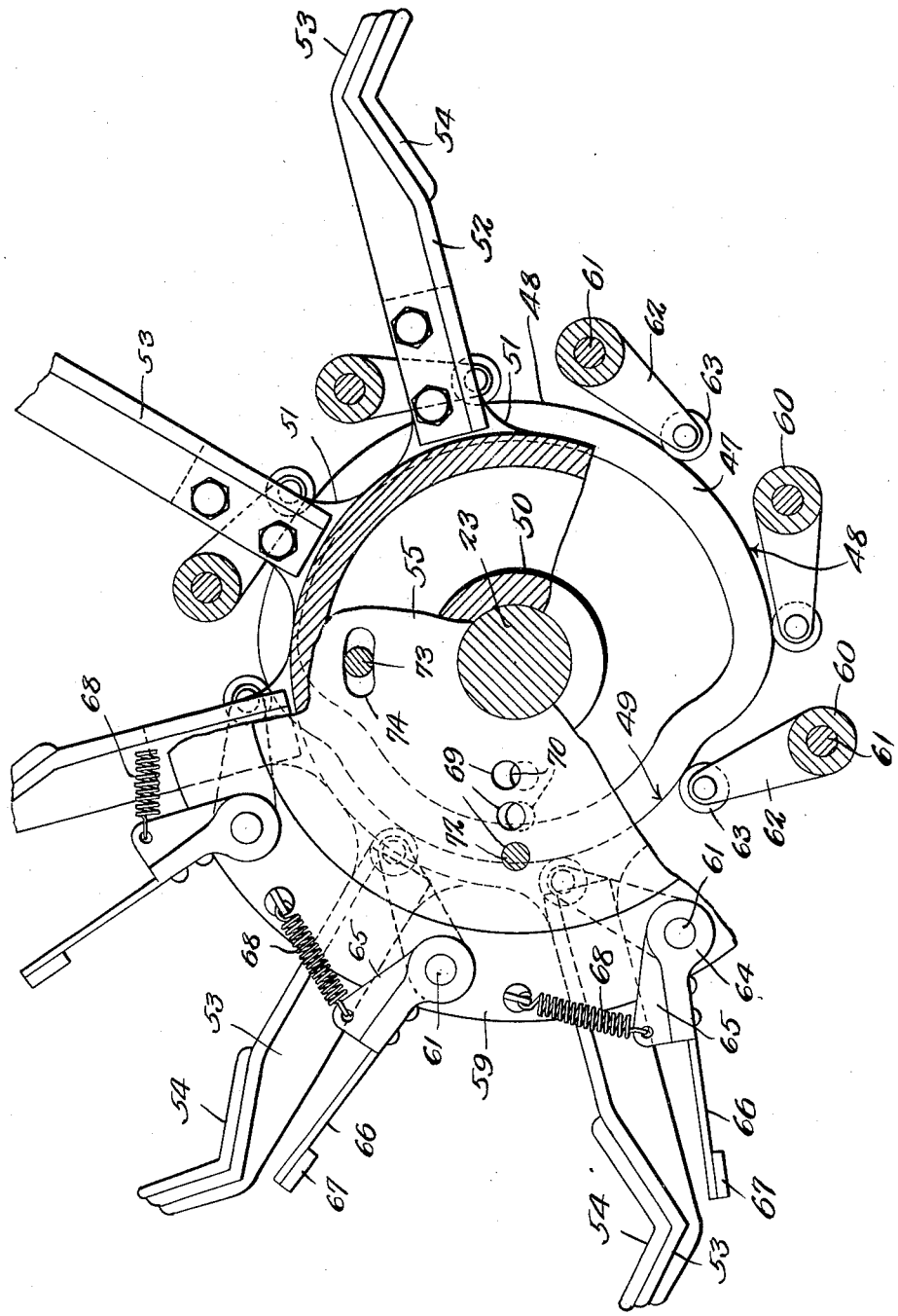

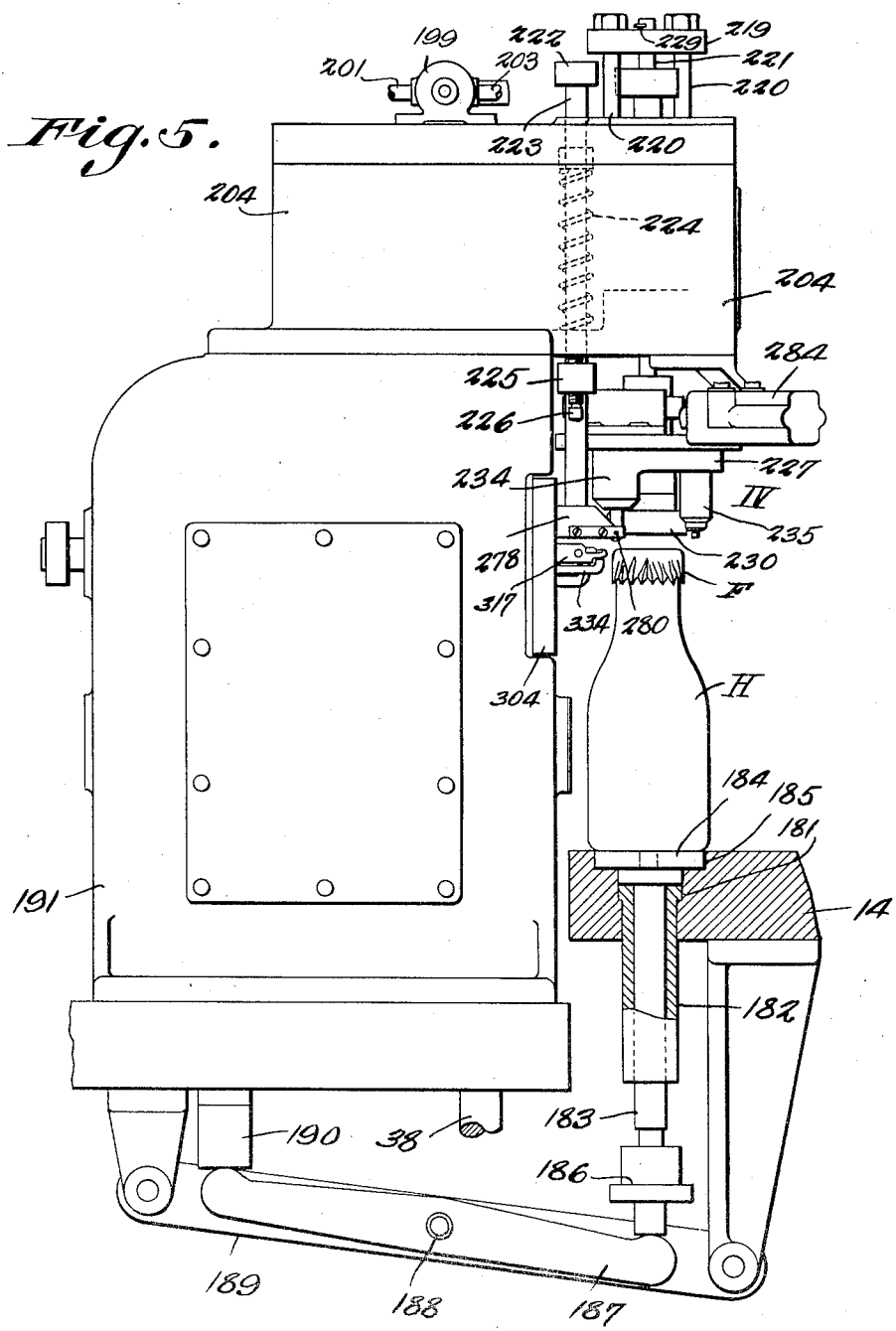

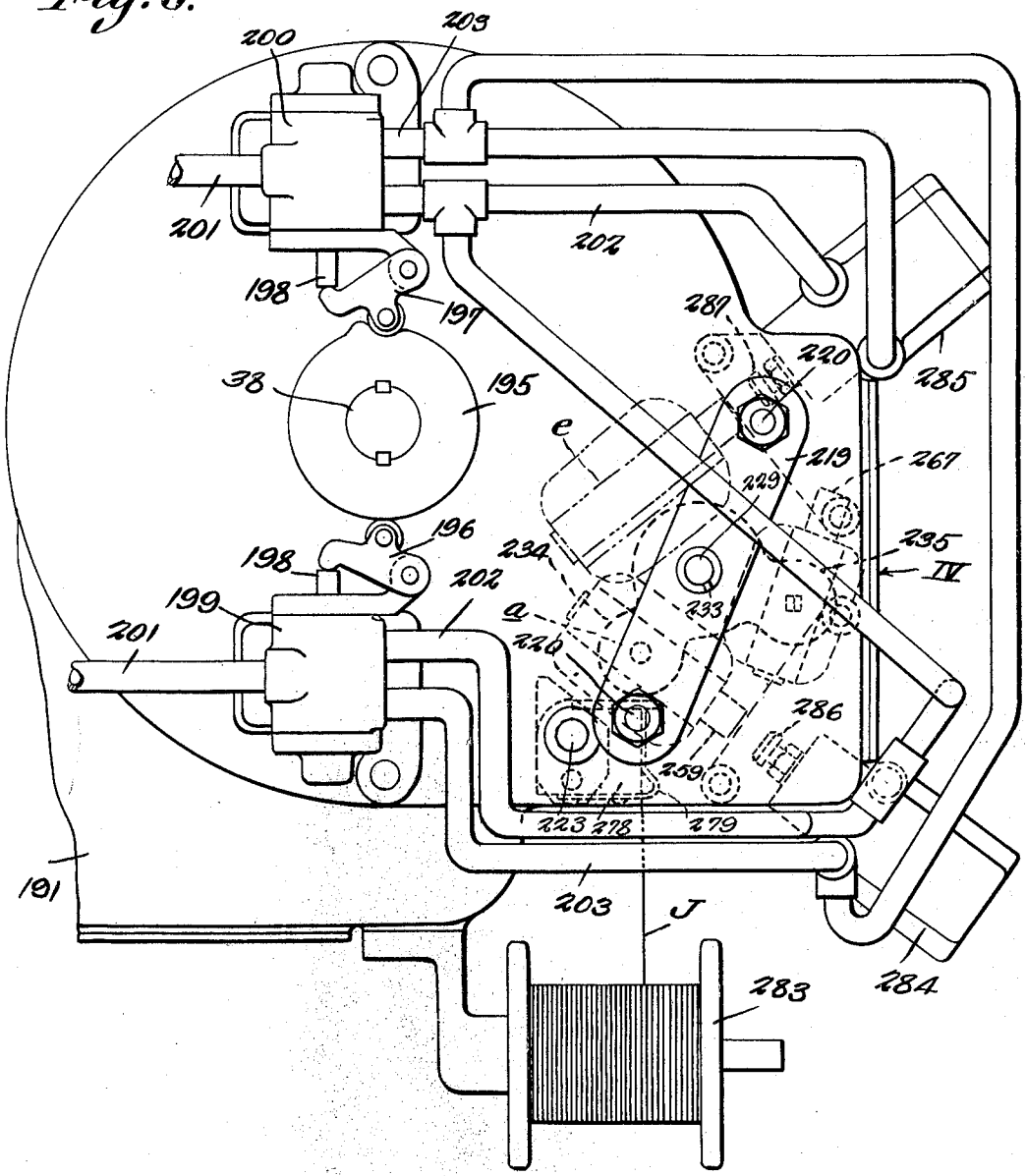

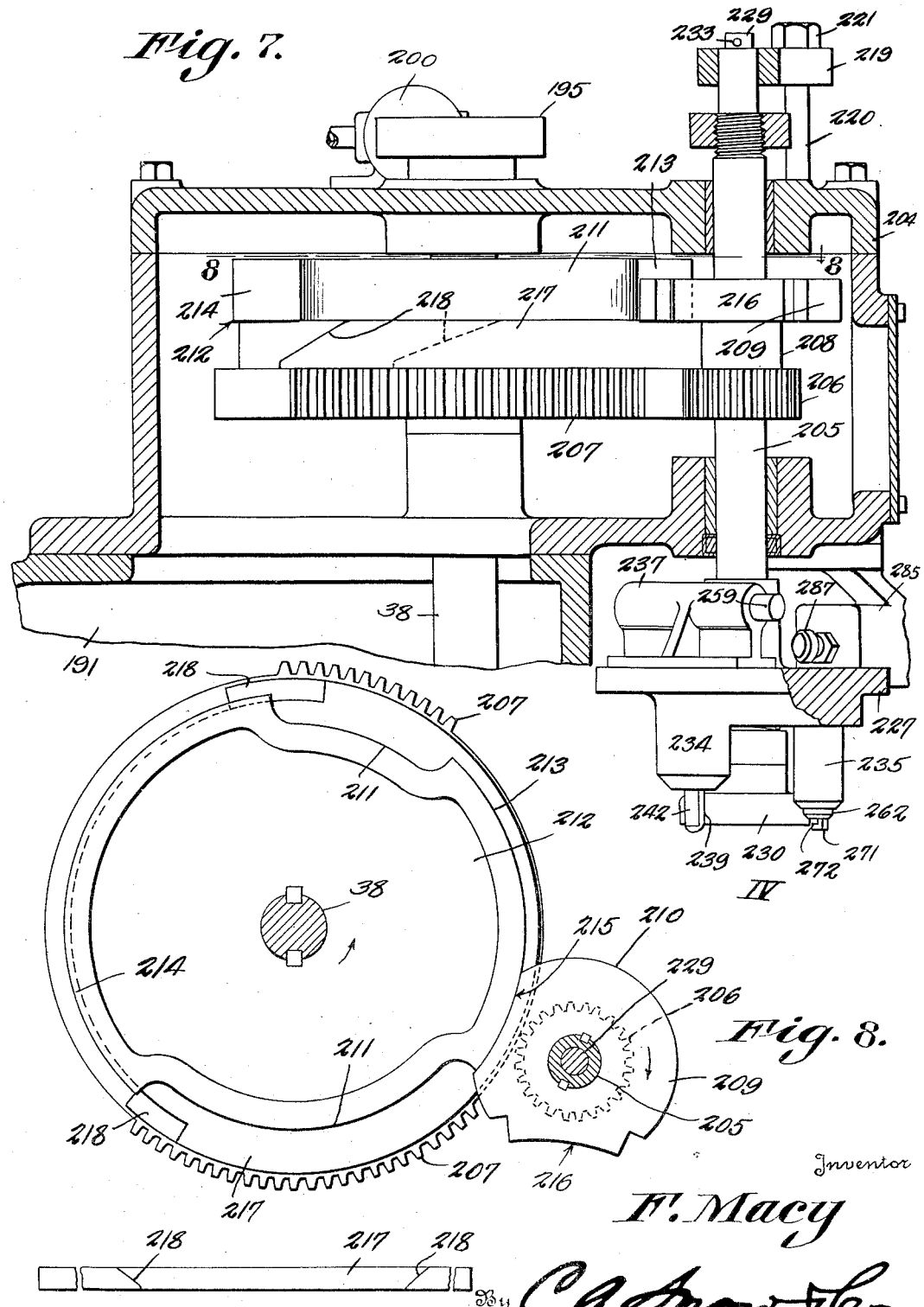

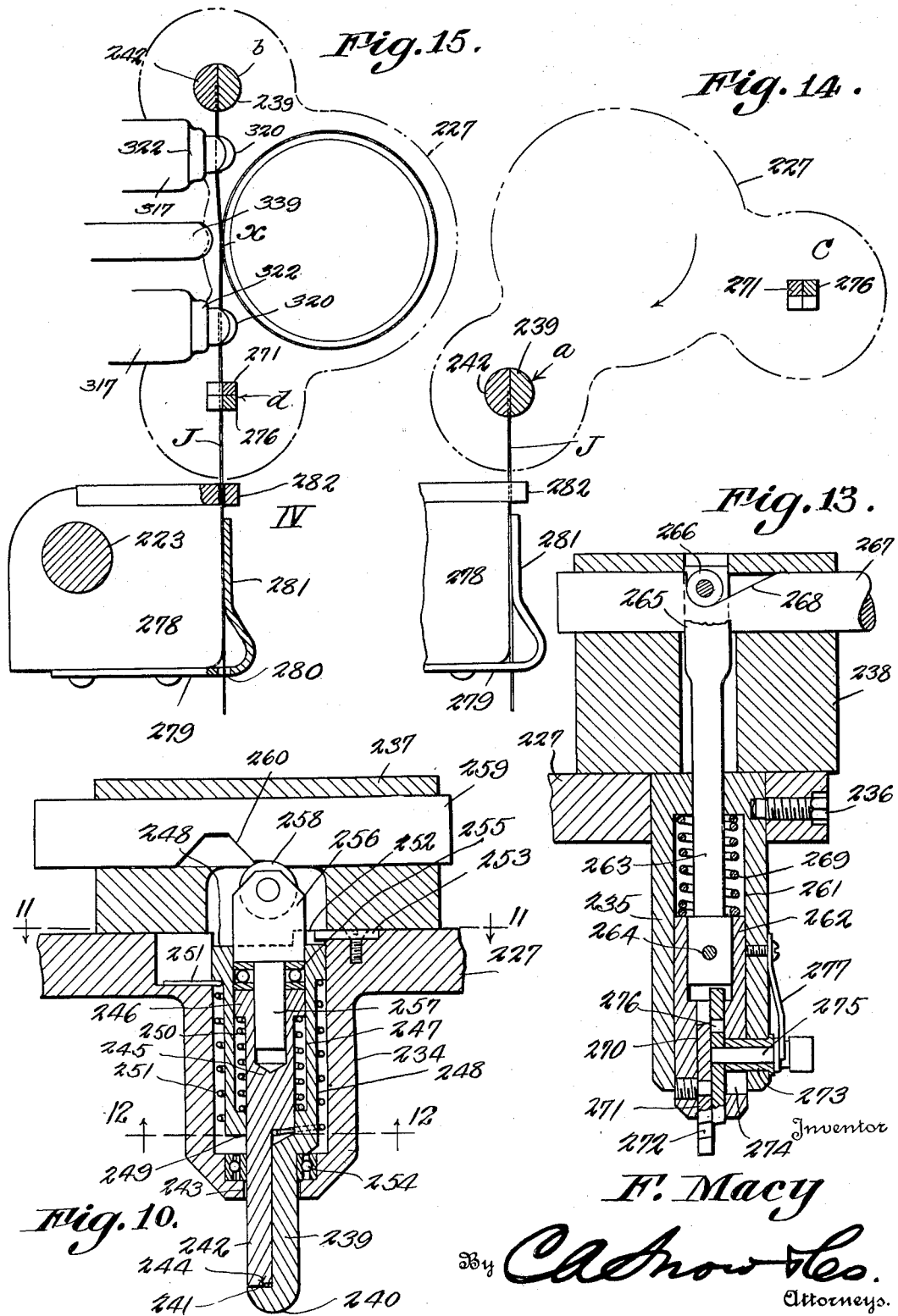

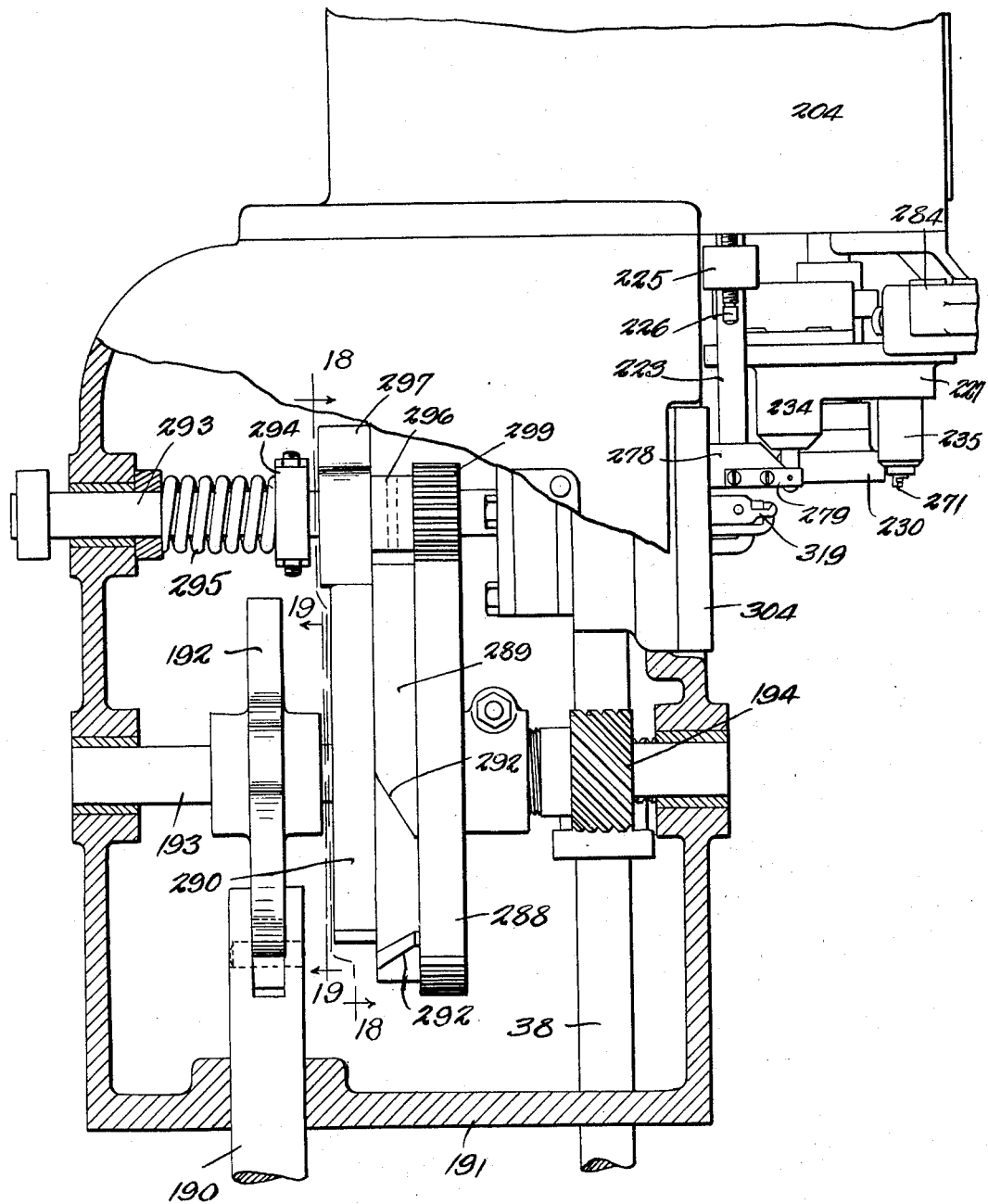

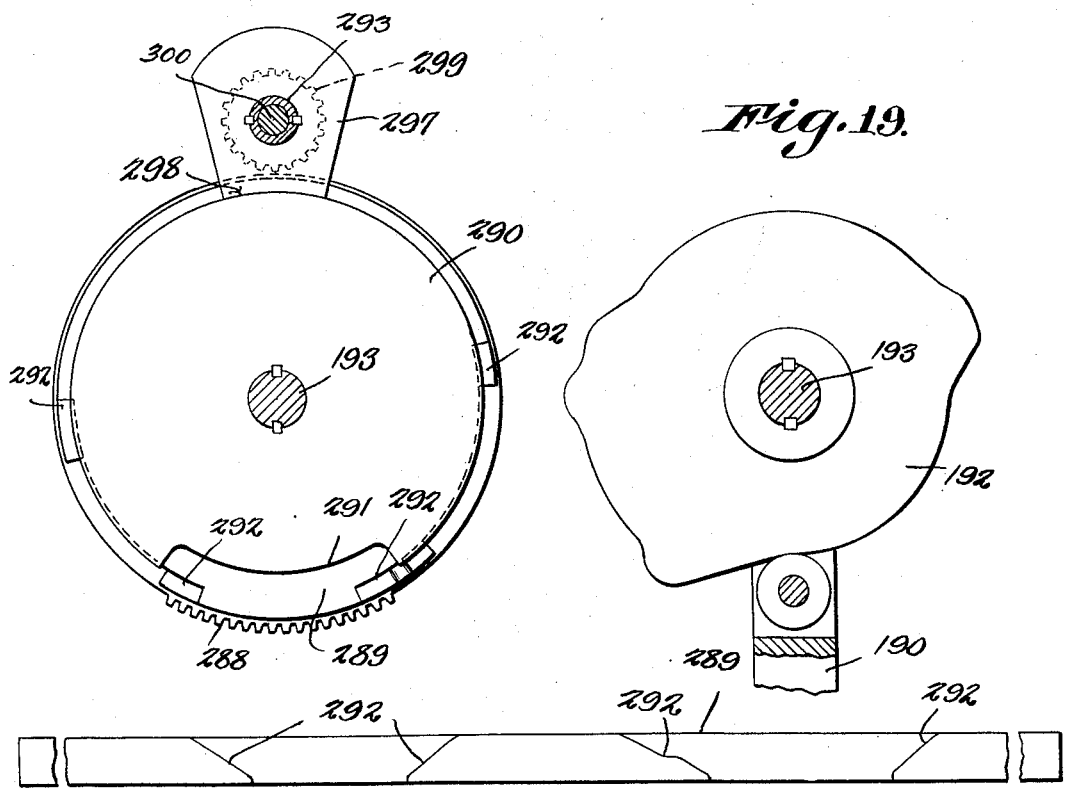

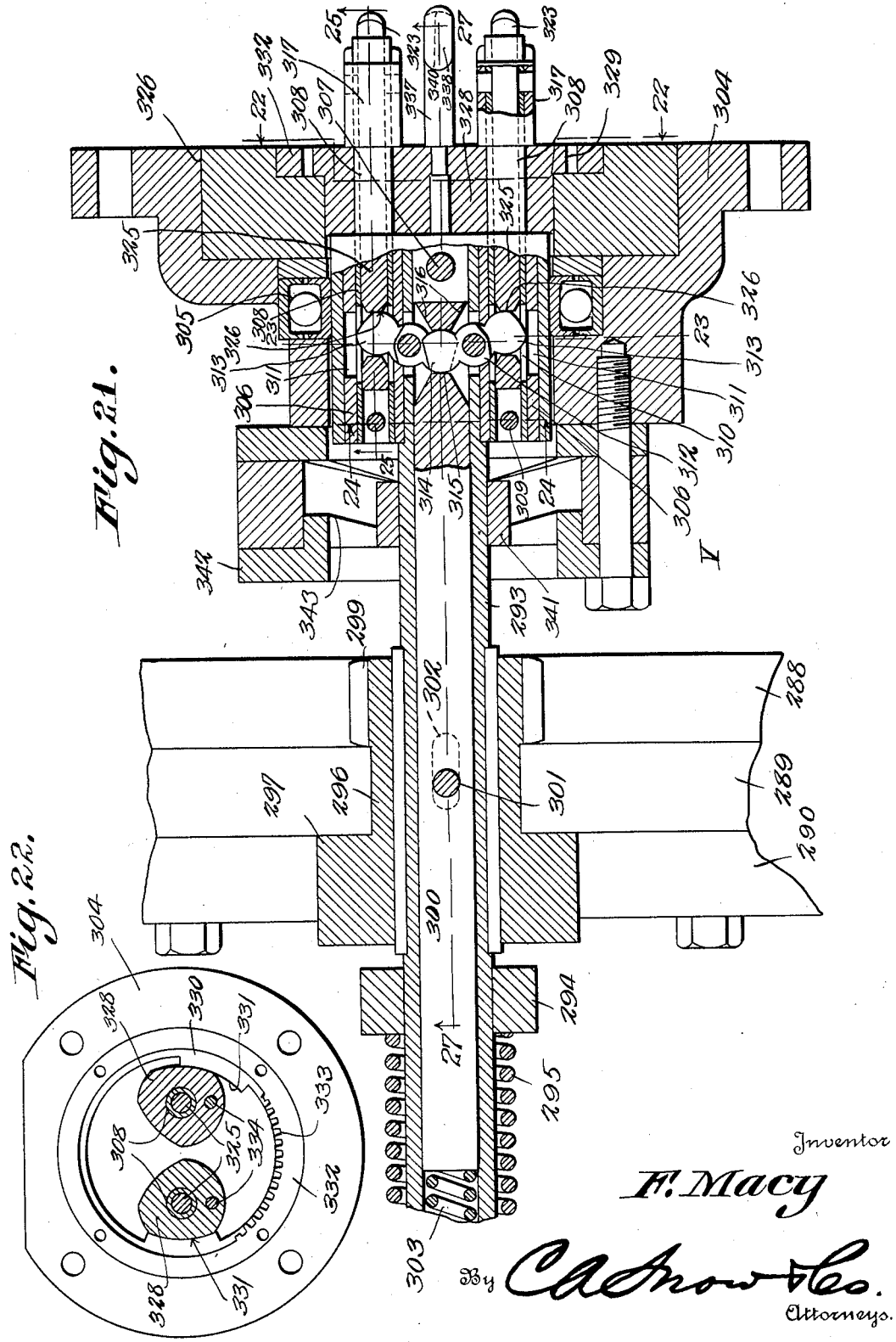

May 29, 1934.  F. MACY  1,960,248
METHOD OF AND MEANS FOR PREPARING AND APPLYING
FIBROUS COVERS TO BOTTLES AND THE LIKE
Filed March 31, 1932  14 Sheets-Sheet 14

Inventor
F. Macy
By CA Snow & Co.
Attorneys.

Patented May 29, 1934

1,960,248

UNITED STATES PATENT OFFICE 1,960,248

METHOD OF AND MEANS FOR PREPARING AND APPLYING FIBROUS COVERS TO BOTTLES AND THE LIKE

Frank Macy, Converse, Ind.

Application March 31, 1932, Serial No. 602,368

10 Claims. (Cl. 140—94)

This invention relates to a method of and means for preparing and applying fibrous covers to milk bottles and other containers.

It is an object of the invention to provide new and improved means whereby skirted caps or covers can be securely attached to milk bottles and the like, the operation being automatic.

It is a further object to utilize a wire as a fastening means for the cover, new and novel mechanism being provided for wrapping the wire around the container and the skirt portion of the cover thereon, twisting the wire, and looping the ends of the wire so that they will not cause injury.

With the foregoing and other objects in view which will appear as the description proceeds, the invention resides in certain steps of the method and in certain details of construction and combination of parts hereinafter more fully described and pointed out in the claims, it being understood that changes may be made without departing from the spirit of the invention as claimed.

In the accompanying drawings has been shown the apparatus constituting a part of the present invention and which is used in carrying out my improved method.

In said drawings:

Figure 3 is a section on line 3—3, Figure 1.

Figure 4 is a section on line 4—4, Figure 3.

Figure 5 is an elevation of the cover fastening mechanism and adjacent parts.

Figure 6 is a plan view showing the apparatus for pneumatically controlling the wrapping mechanism.

Figure 7 is a vertical section through the wire-wrapping mechanism.

Figure 8 is a section on line 8—8, Figure 7.

Figure 9 is a face view of the lifting cam.

Figure 10 is an enlarged vertical section through the wire gripping means of the wrapping mechanism.

Figure 11 is a section on line 11—11, Figure 10.

Figure 12 is a section on line 12—12, Figure 10.

Figure 13 is a vertical section through the wire-cutting mechanism.

Figure 14 is a horizontal section through the wire-gripping and cutting means, showing them in their initial positions, the location of the head thereabove being indicated by broken lines.

Figure 15 is a view similar to Figure 14 illustrating the relative positions of the parts upon the completion of the wrapping operation but prior to the twisting operation.

Figure 16 is a vertical section through the twisting head showing the cover on a bottle and the wire wrapped therearound prior to twisting.

Figure 17 is a view partly in elevation and partly in section illustrating the wire twisting mechanism.

Figure 18 is a section on line 18—18, Figure 17.

Figure 19 is a section on line 19—19, Figure 17.

Figure 20 is a diagram illustrating the face of the cam shown in Figure 18.

Figure 21 is an enlarged central longitudinal section through the twisting mechanism.

Figure 22 is a section on line 22—22, Figure 21.

Figure 29 is a plan view of a portion of the strip material used in connection with this machine.

Figure 30 is a plan view showing the cover pleated prior to its application to a bottle.

Figure 31 is a similar view showing the pleats folded back prior to the application of the cover to a bottle.

Figure 32 is a view similar to Figure 31 showing the fastening wire wrapped about the cover, the positions of the terminals of the wire when inturned to form loops being indicated by broken lines.

Figure 33 is an elevation of the upper portion of a bottle having the complete cover fastened thereon following the delivery of the container from the machine.

Figure 1:
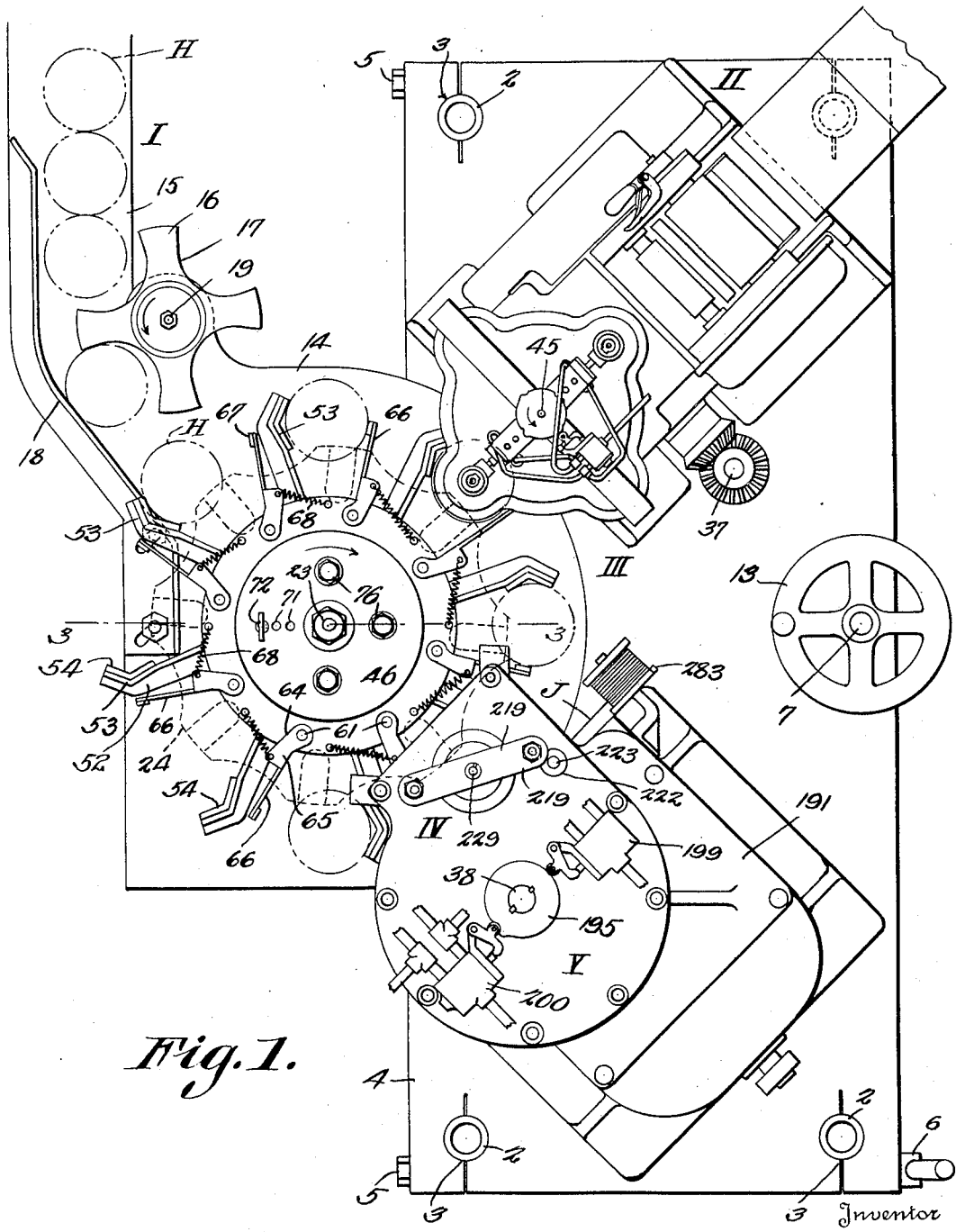
Figure 1 is a plan view of the complete machine.
Figure 2:
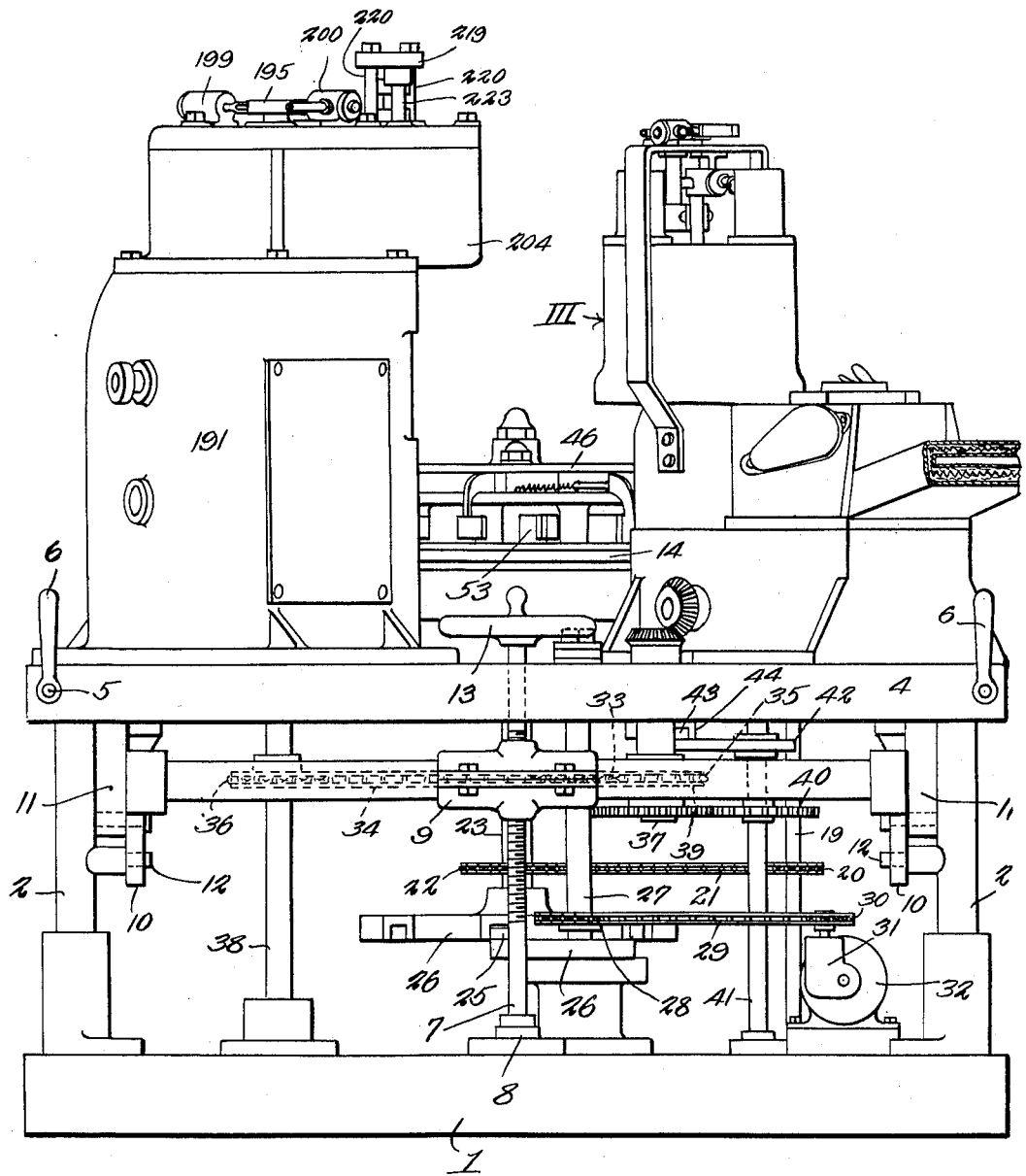
Figure 2 is a rear elevation thereof.
Figure 23:
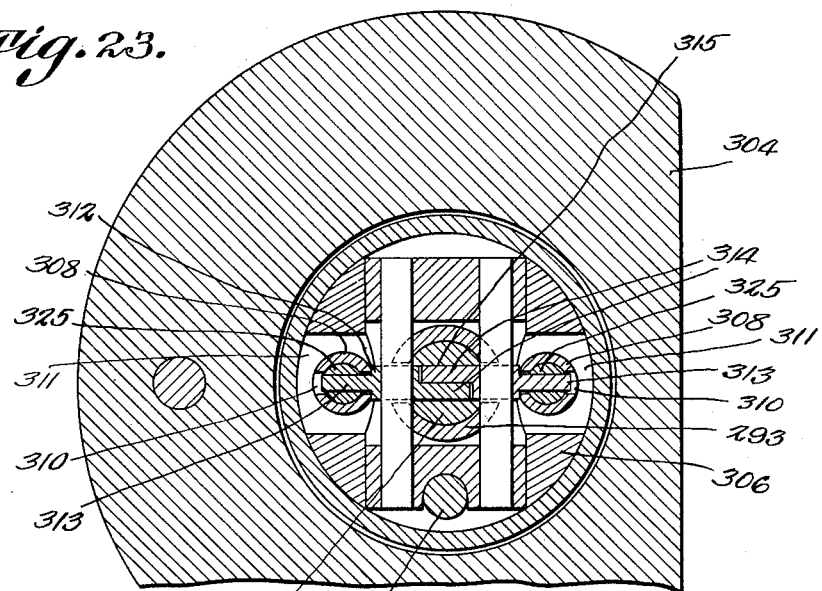
Figure 23 is a section on line 23—23, Figure 21.

The present invention requires the use of a strip of paper or other fibrous material of the requisite strength which is prepared in roll form prior to shipment to those points where covers are to be applied to milk bottles or other containers. As shown particularly in Figure 29 this strip of material, indicated at A has its side edges cut away at regular intervals to provide recesses B. The sides of each recess diverge from an inner rounded portion C to outer transversely extended portions D. It is intended to sever this strip at its point of use along a line connecting the innermost portions of the recesses, as indicated by a dotted line at E in Figure 29 and the amount of material in the area between every two lines E is such as to form a complete skirted cover F, the marginal portion of which is formed with flat substantially triangular folds or pleats G. Thus the cover with the skirted or pleated portion extended around a bottle H can be fastened securely and snugly in place by means of a wire J, the end portions of which are twisted together at K (see Figure 33) so as to provide oppositely extended fingers L the terminals of which are bent back or looped at M to prevent the wire from scratching or pricking a person handling the container to which it has been applied. The wire J will, of course, hold the pleats or folds tightly pressed about the container so that the mouth portion of said container will thus be fully protected.

When preparing the strip material any suitable printed matter such as indicated, for example, at N can be impressed on the strip in each of the cover sections. The strip material is adapted to be wound into a tight roll which can be housed in a sealed cover. Several thousands of these cover sections can be included in a single rolled strip and the roll can be shipped at a much lower cost than would be possible by shipping a like number of caps or covers finished at the factory and packed in tubes or other containers. Furthermore material prepared as described is delivered to the user in a sanitary condition because it has not been touched by hands.

For the purpose of carrying out the method herein described a special form of mechanism has been devised this being illustrated in the accompanying drawings. The said machine includes a container feeding mechanism I, web—feeding mechanism II, a cover-forming mechanism III, a wire-wrapping mechanism IV and a twisting mechanism V. However the wire wrapping and twisting mechanisms only are covered by this application.

The base 1 of the machine is provided with upstanding posts 2 which extend through split openings 3 formed in an adjustable table 4. This table is adapted to be held securely in any position to which it may be adjusted by means of elongated bolts 5 which extend through the table and transversely of the split portions so that, by means of nuts 6 the split portions can be contracted upon the posts as will be obvious. Adjustment of this table is effected by means of a screw 7 which extends loosely through the table 4 and bears at its lower end on the base 1, as indicated at 8. A crosshead 9 is engaged by the screw and has levers 10 mounted on opposed end portions thereof. At intermediate points these levers are pivotally connected to brackets 11 depending from table 4 and the levers also have pivotal and slidable connections at 12 with some of the posts 2. Screw 7 is adapted to be rotated by a hand wheel 13 or the like. Thus it will be seen that by rotating the screw the levers 10 can be actuated to raise or lower the brackets 11 and the table 4 after the bolts 5 have been loosened. Thereafter the nuts 6 can be tightened on the bolts to fasten the table as heretofore explained.

Table 4 carries the various mechanisms and by adjusting the table as heretofore explained these mechanisms can be adapted for use in connection with milk bottles or other containers of different heights.

For the purposes of illustration the machine herein described has been shown adapted to apply covers to milk bottles but it is to be understood that various parts of the machine can be so shaped as to apply covers to other types of containers. The term bottle as herein used is to be understood as applying to any kind of a rigid container to which covers can be applied.

Bottle feeding mechanism

This mechanism, which has been indicated generally at I, includes a stationary table 14 provided with an extension 15 to which bottles or other containers H are supplied by any suitable means so that they will travel in a row and be supplied one at a time to a feed wheel 16 having peripheral bottle-receiving recesses 17. A guide 18 or the like is extended along the extension 15 and a portion of the table 14 so that as each bottle becomes engaged by wheel 16 it will be carried thereby along the guide 18 into position for the special bottle conveying means which is provided above table 14.

The feeding wheel 16 has a shaft 19 to which it is secured, this shaft being extended downwardly through the extension 15 and provided with a sprocket 20 or the like for receiving motion through a chain or other type of belt 21 from a sprocket 22 or the like secured to the shaft 23 of the main bottle conveyor. This shaft has a Geneva wheel 24 attached to it for intermittent rotation by a roller 25 on an arm 26 which is secured to and rotates with a shaft 27. This shaft is operatively connected by a sprocket 28 to a chain 29 receiving motion through a sprocket 30 from speed reducing gearing, indicated generally at 31, which is driven by a suitable motor 32.

Another sprocket 33 is secured to the shaft 27 and is adapted to transmit motion through a chain 34 to sprockets 35 and 36 secured to separate shafts 37 and 38. A gear 39 is driven by shaft 37 and meshes with a gear 40 secured to shaft 41. This shaft, in turn, has an arm 42 rotatable therewith and carrying a roller 43 adapted to intermittently rotate a Geneva wheel 44 secured to shaft 45.

Much of the mechanism thus far described constitutes the means for transmitting motion from the motor 32 to other mechanisms of the machine and does not constitute any part of the present invention.

For example the shaft 23 is extended upwardly approximately at the center of table 14 and has a disk 46 fixedly secured to its upper end by any suitable means so that the disk and shaft will rotate together. The shaft also has secured to it a cam disk 47 which is supported close to or upon the surface of table 14. As shown particularly in Figure 4 the periphery or working face of this cam 47 is concentric with shaft 23 through approximately 180°, the end portions of this concentric portion 48 being curved inwardly to a shorter concentric portion 49 disposed nearer to the shaft 23 than is the other concentric portion 48.

Interposed between disk 46 and cam 47 is a lower hub member 50 mounted for angular adjustment on shaft 23 and provided on its periphery with regularly spaced radial fingers 51. To each of these fingers is secured a drag arm 52 extending laterally relative to shaft 23 and provided at its outer end with a jaw 53 having a recessed advancing face which can be covered with any suitable protecting material such as a layer 54 of leather or the like.

Bearing downwardly on the lower hub member 50 is an upper hub member 55 which is mounted for angular adjustment on shaft 23 and has a depending integral sleeve 56 seated in a counterbore 57 provided in the upper portion of the lower hub member 50. The upper hub member 55 is arranged snugly between hub member 50 and disk 46 and has its marginal portion extended downwardly at 58 so as to surround a portion of the lower hub member 50. This depending portion has an annular flange 59 provided with regularly spaced depending bearing sleeves 60 which can be integral with the flange and project between the arms 52. In each of these sleeves 60 is journaled a vertical shaft 61 at the lower end of which is secured a tripping arm 62 preferably provided at its free end with an antifriction roller 63 adapted to ride along the face of cam 47, as shown particularly in Figure 4.

To the upper end of each shaft 61 is fixedly secured a sleeve 64 having an ear 65. To this ear is secured an outwardly and downwardly extended clamping arm 66 the outer end of which constitutes a jaw 67 for cooperation with the jaw 53 following it in the cycle of operations. In other words, one of the jaws 67 is in advance of each of the jaws 53 and each of these jaws 67 is normally pulled away from its cooperating jaw 53 by a spring 68, one end of which is attached to ear 65 while the other end is attached to flange 59. If desired the arms 66 can be made resilient to compensate for variations in sizes of bottles to be gripped.

The cam 47 and the arms 62 are so shaped and proportioned that during the movement of rollers 63 along cam surface 49 the clamping arms 66 will be spaced forwardly from their cooperating jaws 53 to permit the insertion of a bottle or other container H between the jaws 53 and 67. While the jaws are thus spread apart they arrive in position adjacent to the delivery end of the table extension 15 so that the wheel 16, operating in properly timed relation with shaft 23, will feed a bottle into position in front of each drag arm 52 as it arrives at the bottle receiving point. After the bottle or other container H has been directed into position in front of drag arm 52 and its jaw 53, the shaft 23 will be partially rotated by the Geneva wheel mechanism heretofore described and when the received bottle leaves the receiving station the clamping arm 66 in advance of said bottle will be swung towards and against the bottle so as to grip it between the jaws 67 and 53. This action will be in opposition to the pull of spring 68 and will be effected by the movement of the roller 64 belonging to said arm 66 onto the outermost cam surface 48 of cam 47. Thus during successive movements of the bottle from the point of reception past the cover-receiving station and the wire-applying and twisting stations, the bottle will remain gripped by the jaws and will thus be properly held until it reaches the point of delivery from the machine at which time roller 63 will move inwardly under the action of its spring 68 onto the cam surface 49.

As before stated the bottle-conveying means herein described is rotated intermittently and the Geneva wheel mechanism provided for that purpose will produce pauses of sufficient duration to permit the completion of the several operations necessary at the several stations during the movement of the bottle or other container.

In order that a desired adjustment of the bottle-conveying means can be effected in a simple but efficient manner, the hub member 55 is provided with a series of apertures 69 the centers of which are on a straight line forming an acute angle relative to that radius extending from the center of shaft 23 to the center of the outer aperture 69. This will be clearly apparent by referring to Figure 4. The other hub section 60 is also provided with a series of apertures or recesses 70 corresponding with the apertures 69 but having their centers on a straight line diverging away from the center line of the series of apertures 69 and in the direction of shaft 23. Thus, as shown in Figure 4, the outermost apertures 69 and 70 can be brought into alinement or the two hub members 50 and 55 can be slightly rotated in opposite directions to bring the intermediate apertures 69 and 70 into alinement. More extensive adjustment in the same direction can be effected by bringing the innermost apertures 69 and 70 into alinement. This relative adjustment of the two hub members results in shifting the arms 66 and 52 toward each other or vice versa, as desired. For the purpose of maintaining the hub members in the positions to which they are adjusted, disk 46 is provided with a radial series of apertures 71 any one of which is adapted to receive a key in the form of a pin 72 which can be inserted into the registering apertures 69 and 70 under any one of the apertures 71.

As a further means for holding the parts 50, 55 and 46 against relative movement after they have been adjusted, stud bolts 73 can be extended upwardly from the hub member 50 through short arcuate slots 74 and 75 formed in hub member 55 and disk 46, and by means of nuts 76 on the upper ends of these bolts the disk and the hub members can be clamped together tightly.

When each bottle H reaches station III and stands there during a pause in the operation of the conveying mechanism, it is supplied with a cap or cover which had previously been formed at station III from a length of material taken from a strip of paper A and fed into the apparatus. This strip of paper is cut off along lines E and each section so produced is shaped about the mouth of the bottle at station III to form a cover, any suitable means being provided to produce that operation.

After a cover has been applied to a container at the station III, said container, with the cover thereon, is moved along the table 14 to the next station (IV) where a wire is wrapped about the skirt of the cover to bind said skirt tightly to the neck of the container, this operation to be followed by that of twisting the wire and looping the ends thereof. At station IV the table 14 is formed with an opening 181 having a depending guide sleeve 182 in which a plunger 183 is mounted to slide. This plunger is provided at its upper end with a flat head 184 normally seated in a counterbore 185 so that the top of the head is normally flush with the top of the table. This head is located where it will support a container H during a pause in the operation of the container-conveying mechanism.

The lower end of the plunger 183 has an adjustable extension 186 for contact with one end of a lever 187 which is fulcrumed at 188 on a suitable support 189 provided therefor. See Figure 5. The other end of the lever bears upwardly against a plunger 190 slidably mounted in the bottom of a housing 191 and adapted to be thrust downwardly at properly timed intervals by a cam 192 secured to shaft 193 journaled in the casing 191. See Figure 17.

Worm gearing, indicated at 194, is utilized for transmitting motion to shaft 193 from shaft 38 which extends upwardly within housing 191 and has a cam 195 secured to the upper portion thereof for cooperation with tripping levers 196 and 197 which act on the stems 198 of valves contained in opposed casings 199 and 200. Each of these valves and casings has an intake pipe 201 opening into each casing and outlet pipes 202 and 203 leading from the respective casings.

The housing 191 has its top portion 204 extending over the aperture 181 in table 14 and mounted for rotation in this overhanging portion is a sleeve 205 coaxial with the opening 181. Secured to the sleeve 205 so as to rotate therewith is a gear 206 adapted to be intermittently rotated by a mutilated gear 207 which rotates with shaft 38. Gear 206 is connected by sleeve 208 with the locking plate 209, shown in plan in Figure 8. This locking plate has an arcuate peripheral portion 210 for rolling contact with spaced depressed portions 211 of the periphery of a cam 212 which rotates with shaft 38. The remaining portions of the periphery of cam 212 and which have been indicated at 213 and 214 are adapted to slidably engage annularly spaced concave faces 215 and 216 respectively, formed in the periphery of plate 209. Thus, for example, while face 215 is in contact with the peripheral portion 213 of cam 212, said cam can rotate while, at the same time, sleeve 208 will be held against rotation. The toothed portions of the mutilated gear 207 are located in line with the depressed portions 211 of cam 212. Thus as the peripheral portion 213 moves out of engagement with the concave face 215 (see Figure 8) gear 206 will be meshed with one of the toothed portions of gear 207 with the result that plate 209 and gear 206 will be rotated in the direction indicated by the arrow in Figure 8 until ultimately gear 207 passes out of mesh with gear 206 and the concave surface 216 is brought to position where it can be slidably engaged by the arcuate surface 214 of cam 212. Consequently following the rotation of plate 209, gear 206 and sleeve 208 through approximately 468°, further rotation of these parts will be stopped until surface 216 passes off surface 214 and gear 206 is meshed by the shorter row of teeth on gear 207. At this time gear 206 and plate 209 are again rotated to restore plate 209 to its initial position relative to the cam 212 and as shown in Figure 8.

A cam 217 is interposed between intermittent or mutilated gear 207 and cam 212 and is fastened to shaft 38 so that these parts will all rotate as one body. Cam 217 has inclined peripheral wings 218 adapted to ride under the marginal portion of the locking plate 209 so as to bodily lift said locking plate, its sleeve 208 and gear 206 at predetermined times during the rotation of shaft 38.

Sleeve 208, gear 206 and locking plate 209 are keyed to sleeve 205 so that these parts will all move upwardly and downwardly together under the action of cam 217 and also rotate together. The up and down movement of the parts 206 and 209 will not be sufficient to disengage them from those parts coacting therewith.

The upper end of sleeve 205 is connected to a cross head 219 mounted to slide on guide rods 220 having rods 221 for adjustably limiting the upward movement of the cross head. The downward movement of the cross head is limited yieldingly by the head 222 of a rod 223, the downward movement of which is resisted by a spring 224. The rod has a foot 225 carrying a screw 226 which constitutes an adjustable stop for limiting the upward movement of rod 223 under the action of its spring.

Secured to the lower portion of a sleeve 205 so as to slide and rotate therewith, is a turret 227 having a central recess 228. A shaft 229 is mounted for limited sliding movement in sleeve 205, the sleeve and shaft being arranged for relative rotation. This shaft extends below the turret 227 and is provided at its lower end with an inverted cup 230 so proportioned as to receive the pleated cover F and the end of the container H on which it is mounted. To facilitate application of the cup to the cover and container the lower end thereof is preferably flared as indicated at 231.

A coiled spring 232 is seated in the recess 228 and exerts a constant downward pressure on the inverted cup so that shaft 229 is held yieldingly in its lowermost position relative to sleeve 205. Any desired means can be employed for limiting this downward movement of the shaft 229 relative to its sleeve. For example, a pin 233 can be extended diametrically through the upper end of the shaft and lap the upper end of the sleeve.

Extending downwardly from the turret 227 are guide sleeves 234 and 235, sleeve 234 being preferably integral with the turret while sleeve 235 can be detachably fastened thereto by means of a set screw 236 or the like. A bearing 237 is fastened to the turret or formed thereon and extends over guide 234 while another bearing 238 is similarly mounted on the turret over guide sleeve 235.

The axial centers of the two sleeves are preferably spaced annularly approximately 108° and sleeve 234 carries wire gripping means while sleeve 235 carries wire-cutting means.

The wire-gripping means includes a semi-cylindrical shank 239 terminating at its lower end in a substantially semi-spherical jaw 240 presenting a substantially semi-circular gripping face 241. Another semi-cylindrical shank 242 is mounted to slide on the flat face of a shank 239 so that when the two shanks are assembled they constitute a substantially cylindrical structure mounted for rotation in an opening 243 provided in the lower end of sleeve 234. The lower end of shank 242 constitutes one of the jaws of the gripping means, as indicated at 244.

The meeting faces of the two shanks 239 and 242 have their centers along the axis of rotation of said shanks and the upper end of shank 242 is made cylindrical, as at 245, and concentric with the axis of rotation of the shank. The cylindrical portion has a head or enlargement 246 at its upper end mounted to slide within a bore 247 formed in the hollow upper cylindrical end portion 248, of shank 239. The lower end of the enlarged portion 248 is open at 249 to allow for longitudinal movement of shank 242 relative to shank 239.

A coiled spring 250 is extended around the enlarged portion 245 and thrusts upwardly against the head 246, thereby to hold the shank 242 normally raised. A heavier spring 251 is coiled around the enlarged portion 248 and is anchored at one end in the turret 227, as shown in Figures 10 and 11, while its other end bears against the flat face of shank 242 beneath the portion 245. Thus the spring acts to resist rotation of the two shanks 242 and 239 about the axis of sleeve 234 so that a stop lug 252 carried by the upper end of the enlargement 248 is normally pressed against a stop 253.

An anti-friction bearing 254 is arranged within guide 234 and around the shanks 242 and 239 while another anti-friction bearing 255 is interposed between head 246 and a block 256 slidably and rotatably mounted in the upper end of an enlargement 248 and having a centering pin 257 which is rotatable in the enlargement 245.

Block 256 carries a roller 258 which presses upwardly against a pin 259 which is slidable in bearing 237. This pin has a recess in its lower portion at an intermediate point providing cam faces 260. Spring 250 acts normally to press head 246 upwardly so as to transmit a thrust through bearing 255 against block 256 and maintain a contact between roller 258 and pin 259. Enlargement 248 and its shank 239 are held normally raised relative to guide 234 by the spring 251.

Guide 235 has a cylindrical bore 261 extending upwardly thereinto and in this bore is mounted a slide 262. A rod 263 is secured at its lower end in the slide, as shown at 264, while its upper end slides within and extends through the upper end of guide 235 and within the bearing 238. This rod is provided, at its upper end, with a fork or the like, indicated at 265, carrying a roller 266 and this roller is supported on a pin 267 slidable in bearing 238. A notch is provided in the upper portion of the pin and the bottom surface thereof is inclined to form a cam 268 adapted to ride under roller 266, and lift rod 263.

A spring 269 is seated in bore 261 and thrusts downwardly on slide 162.

An angular opening 270 is provided in the lower end of slide 262 and detachably secured in this opening is a movable cutting blade 271 having a wire-receiving notch 272 in one edge.

A sleeve 273 is extended through the wall of guide 235 into a slot 274 in slide 262 and this sleeve carries a spring-pressed pin 275 which is normally projected into a stationary cutting blade 276 which is held in opening 270 and bears against one face of movable blade 271. By pulling outwardly on pin 275 against the action of its spring 277 it can be withdrawn from blade 276 and the said blade removed. Obviously by providing separate openings in the two blades they can be adjustably mounted.

Normally the lower edge of blade 276 is adjusted to the top of notch 272, as shown in Figure 13. The parts are held in these normal positions by spring 269.

Arranged at one side of the turret is a bracket 278 to which is secured a blade 279 having an aperture 280. A spring finger 281 extends from this blade and constitutes a presser foot for binding yieldingly against a wire J which extends across one face of bracket 278 from opening 280 and through a guide 282. This wire is extended from a spool 283 located at any convenient point on the machine.

Supported fixedly from the overhanging portions 204 of the housing are cylinders 284 and 285 containing pistons. The stems of these pistons converge toward the turret and are indicated at 286 and 287 respectively. These stems are normally retracted by pressure supplied to the cylinders from the valve casings 199 and 200 through pipes 202. Pressure through the other pipes 203 is designed to actuate the pistons to project their stems outwardly from the cylinders. The action of these pistons is controlled by the action of cam 195 on the levers 196 and 197.

Normally the turret 227 is in its lowermost position and the gripping jaws 239 and 242 are open at position a in Figure 14 while the cutting blades are located at position c in Figure 14 with their cutting edges spaced apart, as in Figure 13. The open face of notch 272 in blade 271 always faces in the direction of rotation of the turret 227. When the jaws are located as at a in Figure 14 with their faces 241 and 244 spaced apart, the projecting end of the wire J lies between them.

At the instant a container with a cover thereon arrives in position on the head 184 of plunger 183, said plunger is thrust upwardly by pressure of cam 191 in a downward direction through plunger 190 against lever 187. This forces the upper end of the container and the cover thereon into the yieldingly pressed cup 230 as shown in Figure 16. While the container is thus held elevated, the mechanism shown in Figures 7 and 8 is brought into play to release plate 209, sleeve 205 and turret 227 for rotation through approximately 468°. Immediately prior to this rotation of the turret pressure is admitted to cylinder 284 which forces stem 286 against the near end of rod 259, thereby forcing roller 258 downwardly out of recess 260 and causing the end of wire J to be gripped by the faces 241 and 244. As the turret rotates following this gripping action, the gripping jaws move from position a in Figure 14 completely around the skirted portion of the cover to position b in Figure 15. As the gripping jaws are swivelled in their guide 234 the wire will not be wrapped about them during this operation. Instead, the spring 251 will be placed under increased tension and the lug 252 will be moved away from stop 253. During the first portion of the wrapping operation the cam 217 acts momentarily to lift the turret so that at the proper time the cutter 271, on reaching position d in Figure 15, can pass that portion of the wire extended between the guide 282 and the gripping members. Thereafter another slight lifting action will be imparted to the turret by cam 217 to allow the gripping elements to pass over the wire as said elements move between the container and the guide 282 to the position shown in Figure 15. Without these momentary lifting actions the proper winding of the wire would be interfered with. In order that the container may be maintained in proper engagement with the cup during the elevations of the turret, the container is likewise thrust up by plunger 183 in timed relation to the upward movement of the turret. As the gripping elements reach their final position, b, shown in Figure 15, the cutting elements are brought into engagement with the wire at position d. On reaching these positions further movement of the turret is stopped by the disengagement of the gear 206 from the long series of teeth portion of intermittent gear 207 and the turret is then held against further rotation pending the final operation hereinafter described.

While the turret is held as described the projected end of pin 259 is brought in line with the stem 287, as shown by dotted lines at e in Figure 6. Said pin having been moved from position a in said figure through 468° as before explained. When the shifted pin 259 reaches position e pin 267 is brought to position in line with stem 286. Thus at the proper time in the cycle of operations the two stems 286 and 287 will be shifted outwardly against the two pins 267 and 259. This will result in returning pin 259 to its initial position, causing gripping face 244 to move away from the end of engaged wire 241 while pin 267 thrusts its cam face 268 under roller 266, lifts cutting element 271 and severs the wire.

Following the pause in the rotation of the turret while the arcuate surface 214 is riding along surface 216 of plate 209, gear 206 is again rotated by the short series of teeth on gear 207 so as to restore the turret to its initial position illustrated in Figure 14. When the gripping members are released from the held wire at the time of the cutting operation, the tensioned spring 222 rotates them about their axes to their initial positions and as the rod 267 is released from pressure from stem 286, spring 269 exerts sufficient pressure not only to lower cutting element 271 to its initial position but also to thrust the cam face 268 to one side and restore rod 267 to its initial position. As the parts are thus reset it will be obvious that when the turret arrives at its point of starting, as shown in Figure 14, the gripping jaws will be opened to receive the end of the wire between them and the cutting elements will be in position c ready to repeat the operation which has already been described.

Twisting mechanism

As before stated, after the wire has been wrapped about the skirt portion of the cover and brought to the position shown in Figure 15, it is engaged and acted upon by the twisting mechanism indicated generally at V. Referring to Figure 17 it will be noted that shaft 193 has secured to it a mutilated or intermittent gear 288, a shifting cam 289 and a locking disk 290. All of these parts 288, 289 and 290 rotate with shaft 193 and locking disk 290 has its periphery cut away to form a segmental recess 291 located at one side of the toothed portion of gear 288. This is clearly shown in Figure 18. Arranged on the cam 289 at the margin thereof are inclined cam faces indicated at 292 located where they will, at the proper time, exert a thrusting action upon the parts cooperating therewith.

A tubular shaft 293 is mounted in the upper portion of housing 291 and is provided with an adjustable collar 294, against which a spring 295 exerts a constant thrust. Keyed on the tubular shaft 293 is a sleeve 296 one end of which is provided with a locking block 297 provided with a concave face 298 adapted to ride on the periphery of disk 290 until it arrives at the recess 291 at which time the block is released for free rotation relative to disk 290. A gear 299 is also provided on sleeve 293 and is located where it will be engaged by the toothed portion of gear 288 at which time block 297 is free for rotation. Thus it will be seen that during one rotation of shaft 193 gear 288 will impart one complete rotation to tubular shaft 293 after which block 297 will be brought to position with its concave face 298 in sliding engagement with the smooth periphery of disk 299. Consequently after one complete rotation of shaft 293 it will be locked against further rotation until the gears 288 and 299 are again brought into mesh.

During the rotation of shaft 193 and the parts carried thereby the deflecting faces 292 of cam 289 will act at the proper time to press laterally against the block 297 thereby to force said block and the parts connected therewith axially of shaft 293.

A rod 300 is mounted to slide within tubular shaft 293 and this rod is coupled to the sleeve 296 by a pin 301 which extends through diametrically opposed slots 302 formed in the tubular shaft 293. A spring 303 is arranged in one end portion of the tubular shaft 293 and exerts a constant thrust against rod 300.

A bearing 304 is fixedly mounted in the upper portion of housing 191 and is provided with a ball bearing 305 which centers a cylindrical block 306 mounted for rotation in the bearing 304. One end portion of shaft 293 is seated in this block and secured thereto by a pin 307.

Seated in the block 306 are parallel tubular members 308 held against longitudinal movement relative to the block by pins 309. Each of these tubular members is slotted longitudinally as shown at 310 and the slots at these points register with slots 311 formed in the block 306.

Links 312 are fulcrumed in and extend in opposite directions away from tubular shaft 293, the outer ends 313 of these links being rounded and adapted to swing within the slots 310. The inner ends of the links are also rounded and are disposed in lapped relation, as shown at 314. These lapping inner ends have a working fit within an opening 315 formed in rod 300 near one end of the rod and the ends of the opening 315 are flared, as shown at 316 so as not to interfere with the swinging movement of the links when rod 300 is moved longitudinaly relative to the tubular shaft 293.

Each of the tubular members 308 is extended behind the outer end of block 306 and its end supports a sleeve 317 the top of which is bevelled as at 318 while the end of the sleeve merges into a semi-cylindrical tongue 319 having a rounded head 320 with inclined shoulders 321 forming a jaw. This tongue 319 is overhung by another tongue 322 integral with tubular member 308 and cooperating with tongue 319 to form a guide for the semi-cylindrical stem 323 of a movable jaw 324. The end face of this movable jaw is inclined so as to snugly engage the corresponding face 321.

Stem 323 extends from a rod 325 which is slidable in the tubular member 308 and has a slot 326 into which extends the outer end 313 of one of the links 312. Thus it will be seen that when the rod 300 is moved forwardly relative to shaft 293 it will exert a thrust against the lapping ends 314 of links 312 and cause the outer ends of the links to pull back upon rods 325 so as move the stems 322 away from jaws 321. It is to be understood that the exposed portion of stem 323 and the tongue 319 cooperate to form a cylindrical structure when the jaws are closed together. The end of tongue 322 is preferably bevelled, as shown at 327.

Mounted for rotation on each tubular member 308 is a locking block 328 the outer or forward end of which is provided with a gear 329 concentric with tubular member 308. A locking ring 330 is secured in the bearing 304 and provides an interrupted track 331 for intermittent sliding engagement by the blocks 328 at which time said blocks are held against rotation about their individual axes. A ring 332 having an interrupted internal gear 333 is secured in the ring 330 and the teeth of this gear are located where they will be successively engaged by the gears 329 during one rotation of said gears about the axis of shaft 293. As the gears mesh with each other it will be apparent that when the first gear engages with and rolls along gear 333 the two gears 329 will be rotated in one direction while when the second gear 329 meshes with gear 333 the two gears 329 will be rotated in the opposite direction. In other words, the parts are so timed and proportioned that during one complete rotation of shaft 293 and the block 306 the gears 329 will be given ⅝ of one rotation in one direction and thereafter a like rotation in the opposite direction. At the time the gears 329 are out of mesh with gear 333 the blocks 328 are in sliding engagement with the track faces 331 so that said gears and the parts carried thereby will not rotate about their individual axes.

Figure 25:
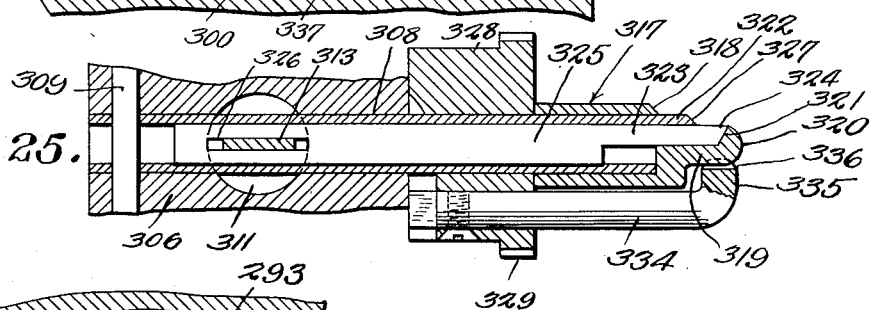
Figure 25 is a section on line 25—25, Figure 21.
Figure 24:
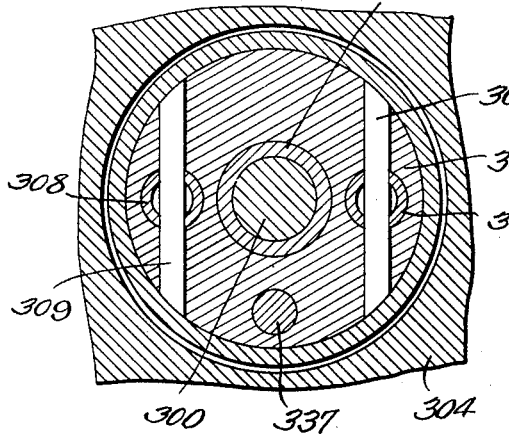
Figure 24 is a section on line 24—24, Figure 21.
Figure 26:
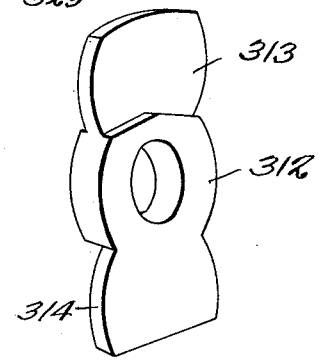
Figure 26 is a detailed view of one of the connecting levers forming a part of the twisting mechanism.
Figure 27:
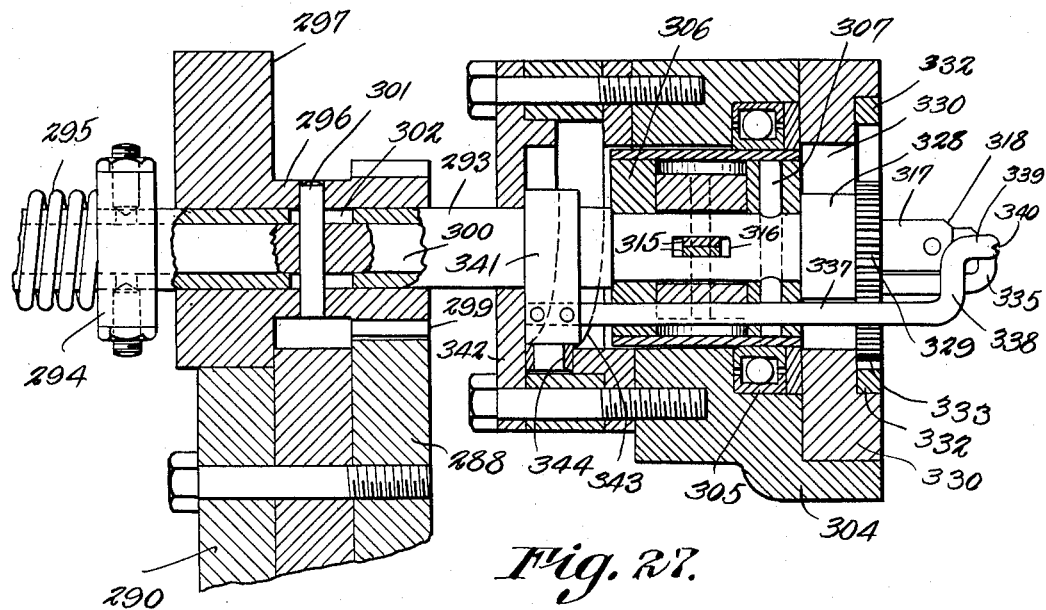
Figure 27 is a section on a reduced scale taken on the line 27—27, Figure 21.

Secured to each gear 329 is a finger 334 the free end of which is bent upwardly as at 335 (see Figure 25) and terminates in a concave shoe or wiper 336 located close to but spaced from the tongue 319. The normal position of this shoe is immediately under the tongue, the blocks 328 being at this time in engagement with the track faces 331.

Slidable in the block 306 is a presser rod 337 which extends forwardly between the gears 329 and emerges in an upwardly extending finger 338 the terminal 339 of which is extended along the axis of rotation of shaft 293 and block 306. The end of this rod is rounded as shown, and has a transverse groove 340.

The back end of rod 337 is connected to a block 341 mounted to slide on shaft 293 within a housing 342 of any suitable construction. This housing is provided in its inner surface with a cam groove 343 in which travels a stud 344. Thus when the block 306 is rotated relative to housing 342 and the bearing 304 the rod 337 will, of course, move therewith and during such movement the stud 334 travelling in cam groove 343 will impart longitudinal movement to the rod 337 in properly timed relation to the operation of the other parts.

The several parts are so constructed and timed that immediately following the winding operation whereby wire J is brought to the position shown in Figure 15, the spring 295 will thrust shaft 293 longitudinally and thereby move the block 306, tubular members 308, rod 300 and rods 325 into position where the jaws 321 and 324 can engage the wire at opposite sides of its point of crossing $x$. This bodily movement of the parts is permitted by coaction of cam 289 and block 297 whereby said block is released for a predetermined movement axially of shaft 293.

Spring 303 maintains rod 300 normally pressed forward so that jaws 324 are normally spaced from jaws 321.

As before explained the container and the turret are held in raised positions during the wrapping operation to allow the cutter to pass over the taut portion of the wire J which, when lifted with the container and turret, will be inclined downwardly toward guide 282 at such an angle as to allow the elevated cutter to pass thereover. Thereafter the container and turret are lowered except for a momentary lift to allow the shanks 239 and 242 to pass over the taut portion of the wire while moving to the position shown in Figure 15. Prior to the lowering of the container and turret the jaws 321 are advanced to positions under the wire. Thus when the container with the wrapper wire thereon is lowered, those portions of the wire at opposite sides of the point $x$ will be lowered between jaws 321 and 324.

Immediately following this action the cam 289 acts on block 297 to pull back on said block and cause pin 301 to thrust rod 300 against spring 303 which is lighter than spring 295. This movement of rod 300 relative to shaft 293 will cause the links 312 to be actuated and thrust rods 325 forwardly so that jaws 324 will clamp the wire against jaws 321, as shown at J in Figure 25. Up to this time the shaft 293 has not been rotated. The grooved end of finger 335 is located close to the point $x$. Immediately following the action described the wire is released from the winding and cutting mechanism which has brought it to the position shown in Figure 15 and has severed the wire. Gear 299 is now engaged by gear 288 so that shaft 293 begins to rotate.

Figure 28:
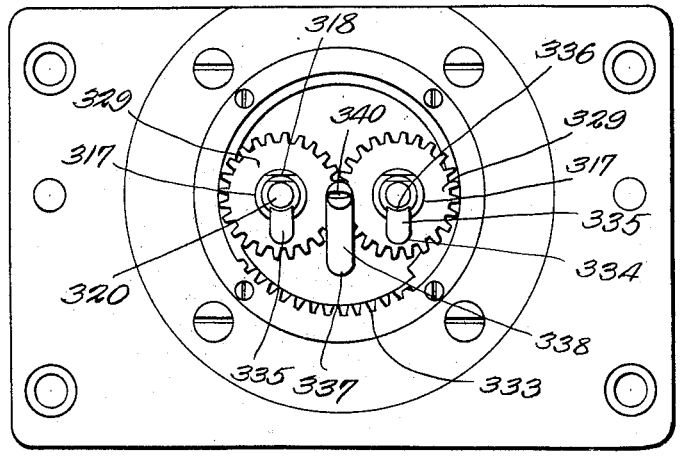
Figure 28 is a front view of the twisting head.

Simultaneously with this action the terminal 339 of finger 338 is thrust forward slightly to bind against the wire at point $x$ and at the same time cam 289 exerts a further thrust on block 297 to restore shaft 293 to its initial position against action of spring 295. The jaws gripping the wire tend to pull it taut across the grooved end of terminal 339 and while the wire is thus held shaft 293 is rotated by gears 288 and 299. One complete rotation is made and this causes the jaws 321 to twist the wires at point $x$. While the jaws are travelling in one complete circle gears 329 are first rotated in one direction to cause the shoes 335 to fold the ends of the wires around the stem 323 and tongue 319 thereby forming terminal loops M. During the second half of the rotation the movement of gears 329 will be reversed and the shoes restored to their normal positions, shown in Figure 28. Immediately following this action the block 297 is again partially released by cam 298, permitting shaft 293 and jaws 321 to advance while, at the same time, jaw 324 will be retracted under guide tongue 323. Thus the loops M will be free to be pulled off the jaws 321 as the completely sealed container is moved away by its carrying mechanism to be replaced by another container on which the foregoing operation is to be repeated.

What is claimed is:

1. The method of applying fibrous covers to containers which includes the steps of positioning the end portion of the container in a formed cover, conveying the container with the cover thereon to a station where the cover is to be fastened, subsequently wrapping wire about the cover at said station and securing it by twisting, and finally forming the terminals of the wire into separate spaced loops.

2. In a machine of the class described the combination with means for applying a cover to a container, and intermittently operated conveying means for the container, of means for lifting the container during a pause in the operation of the conveying means, a cup for receiving a portion of the container and the cover thereon when elevated, and means for wrapping a wire about the cover and container while elevated and through an angle of more than 360° to cross the wire.

3. In a machine of the class described the combination with means for applying a cover to a container, and intermittently operated conveying means for the container, of means for lifting the container during a pause in the operation of the conveying means, a cup for receiving a portion of the container and the cover thereon when elevated, means for wrapping a wire about the cover and container while elevated and through an angle of more than 360° to cross the wire, and means for momentarily lifting the wire-wrapping means during the crossing of the wire.

4. In a machine of the class described, the combination with a rotatable turret and means for intermittently rotating the turret, of separate wire-gripping and wire-cutting means carried by the turret, means for applying a cover to a container, means for conveying the container and cover intermittently to position under the turret, means carried by the turret for receiving the cover and that portion of the container therein, and means operating in properly timed relation during a pause in the movement of the container for successively gripping a wire, rotating the turret through more than 360° to draw the wire around the skirted portion of the cover and cross the wire, and means for simultaneously severing the wrapped portion of the wire and releasing it from the gripping means.

5. In a machine of the class described, the combination with a rotatable turret and means for intermittently rotating the turret, of separate wire-gripping and wire-cutting means carried by the turret, means for applying a cover to a container, means for conveying the container and cover intermittently to position under the turret, means carried by the turret for receiving the cover and that portion of the container therein, means operating in properly timed relation during a pause in the movement of the container for successively gripping a wire, rotating the turret through more than 360° to draw the wire around the skirted portion of the cover and cross the wire, means for simultaneously severing the wrapped portion of the wire and releasing it from the gripping means, a twister for engaging the end portions of the wrapping wire prior to the severance and release thereof, and means for actuating the twister to twist the crossed portions of the severed wire.

6. In a machine of the class described, the combination with a rotatable turret and means for intermittently rotating the turret, of separate wire-gripping and wire-cutting means carried by the turret, means for applying a cover to a container, means for conveying the container and cover intermittently to position under the turret, means carried by the turret for receiving the cover and that portion of the container therein, means operating in properly timed relation during a pause in the movement of the container for successively gripping a wire, rotating the turret through more than 360° to draw the wire around the skirted portion of the cover and cross the wire, means for simultaneously severing the wrapped portion of the wire and releasing it from the gripping means, a twister for engaging the end portions of the wrapping wire prior to the severance and release thereof, means for actuating the twister to twist the crossed portions of the severed wire, and means for successively looping and releasing the terminals of the wire gripped by the twister.

7. In apparatus of the class described the combination with container lifting means, and an inverted cup for receiving a portion of the container and a cover thereon, of a turret mounted for rotation relative to the cup, wire-gripping and wire-severing elements movable with the turret, means for automatically actuating the gripping means to engage the terminal portion of a wire, means for rotating the turret and gripping means through more than 360° to wrap a wire about the cover and container and to bring the severing means into wire-engaging position, means for successively gripping the wire at opposite sides of its points of crossing and releasing and severing the gripped wire from the turret, means for automatically twisting the wire at its point of crossing following its severance and release from the turret.

8. In apparatus of the class described the combination with container lifting means, and an inverted cup for receiving a portion of the container and a cover thereon, of a turret mounted for rotation relative to the cup, wire-gripping and wire-severing elements movable with the turret, means for automatically actuating the gripping means to engage the terminal portion of a wire, means for rotating the turret and gripping means through more than 360° to wrap a wire about the cover and container and to bring the severing means into wire-engaging position, a twister, separate means thereon for gripping the wire at opposite sides of its points of crossing, means for automatically releasing the wire and severing it from the turret while the wire is gripped by said means on the twister, means for rotating the twister to twist the wire at its point of crossing and means rotatable about the individual axes of the wire-engaging means on the twister for looping the terminals of the wire about said wire-engaging means.

9. In a machine of the class described, means for intermittently moving a container having a cover, pairs of gripping jaws extending toward a container during a pause in its movement, a member mounted for rotation and carrying the jaws, means for actuating the jaws to grip a wire embracing the container, means for revolving the jaws about a common axis while gripping the wire to twist the wire, means for rotating the pairs of jaws about individual axes to loop the ends of the wire, and means for moving the jaws toward and from the container in timed relation to the gripping, bending and looping action.

10. The herein described method of closing a container which includes the step of applying to a container a fibrous cover having a pleated skirt, thereafter wrapping a wire about the pleated skirt to hold the pleats compressed, then twisting the wire at its point of crossing, and finally bending the ends of the wire to form terminal loops.

FRANK MACY.